United States Patent [19]
Linehan et al.

[11] Patent Number: 5,495,533
[45] Date of Patent: Feb. 27, 1996

[54] PERSONAL KEY ARCHIVE

[75] Inventors: Mark H. Linehan, Yorktown Heights, N.Y.; Nicholas J. Simicich, Boca Raton, Fla.; Gene Y. Tsudik, Thalwil, Switzerland

[73] Assignee: International Business Machines Corporation, Armonk, N.Y.

[21] Appl. No.: 235,578

[22] Filed: Apr. 29, 1994

[51] Int. Cl.$^6$ ............................................. H04K 1/00
[52] U.S. Cl. ..................... 380/21; 380/23; 380/25; 380/49
[58] Field of Search ................... 380/23, 24, 25, 380/4, 21, 49

[56] References Cited

U.S. PATENT DOCUMENTS

| | | |
|---|---|---|
| 4,238,854 | 12/1980 | Ehrsam et al. . |
| 4,652,990 | 3/1987 | Pailen et al. . |
| 5,081,678 | 1/1992 | Kaufman et al. . |
| 5,349,643 | 9/1994 | Cox et al. ................................. 380/25 |

OTHER PUBLICATIONS

W. M. Goode, "Securing Personal Computers In A Network Environment", Micronyx, Inc. 1901 N. Central Expressway, Richardson, Tex.—document 01–214–690–0595, pp. 135–148.

H. Feinstein, "Security On Unclassified Sensitive Computer Systems", Nat'l. Computer Security Conference Proceedings, Sep. 15–18, 1986, pp. 81–90.

S. Cobb, "Security Software", Which Computer, Sep. 1991, pp. 64–75.

J. G. Steiner, "Kerberos: An Authentication Service For Open Network Systems", Presented at Winter USENIX, 1988, Dallas, Texas.

IBM Technical Disclosure Bulletin, vol. 28, No. 12, May 1986 "Integrity Of Stored Public Key", pp. 5168–5169.

*Primary Examiner*—David C. Cain
*Attorney, Agent, or Firm*—Daniel P. Morris

[57] ABSTRACT

A computing system is described having an automated management system for managing keys to encrypt and decrypt stored data on the computing system. The computing system has an authentication server; a key client; a key generator; a key server; a key database; and an encrypted data file memory. The authentication server authenticates the user and in response to the user accessing the computing system the authentication server provides the user with a ticket validating the user. The key client of a creating user when creating a data file invokes the generator to generate a key corresponding to the data file. The key is provided to the key server and the key client uses the key to encrypt the data file which is stored in the encrypted data file memory. The key client of an accessing user sends its ticket and data file identification data to the key server. The key server checks the ticket and sends the key corresponding to the data file to the key client of the accessing user. The key client of the accessing user uses the key to decrypt the encrypted data file. The stored data can further include a header containing the key and owner and permitted user identification data. The ticket can contain a key to encrypt messages sent between the client server and key client.

39 Claims, 4 Drawing Sheets

| LENGTH OF FILE HEADER | FILE ENCRYPTON KEY, ITSELF ENCRYPTED UNDER A CONTROL KEY | CONTROL KEY INDEX NUMBER | FILE OWNER'S NAME | ACCESS CONTROL LIST | | MESSAGE AUTHENTICATION CHECK |
|---|---|---|---|---|---|---|
| | | | | NAME OF ACCESSOR 1 | • • • | |

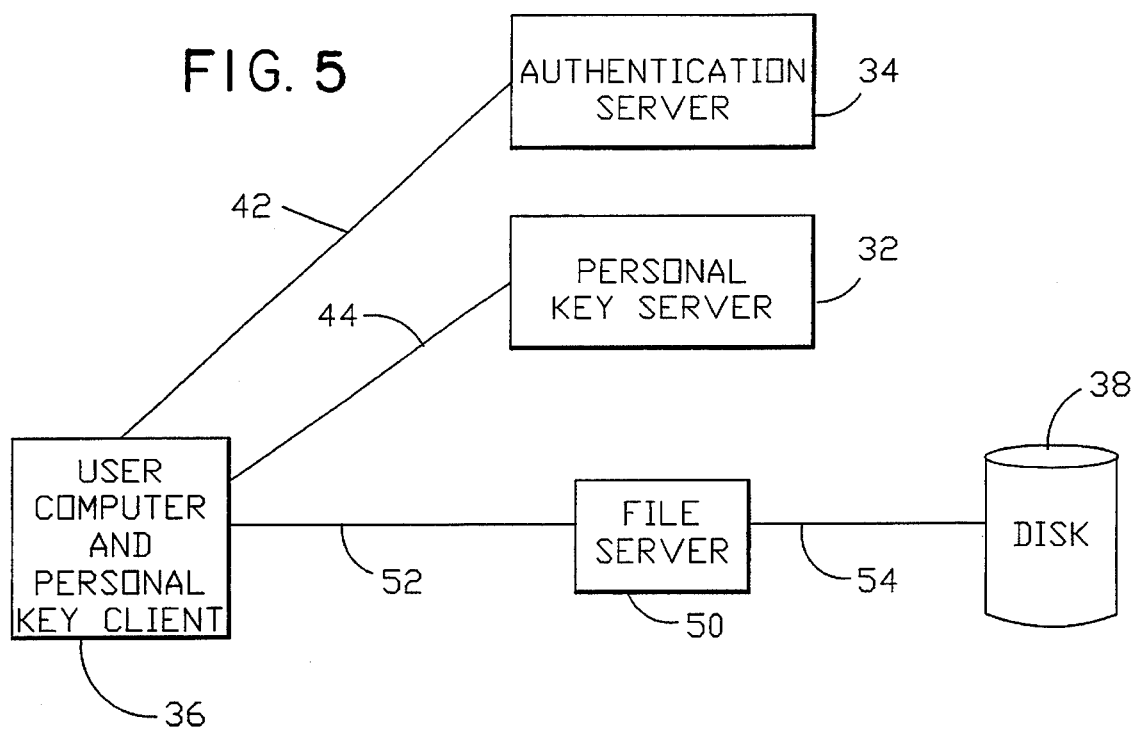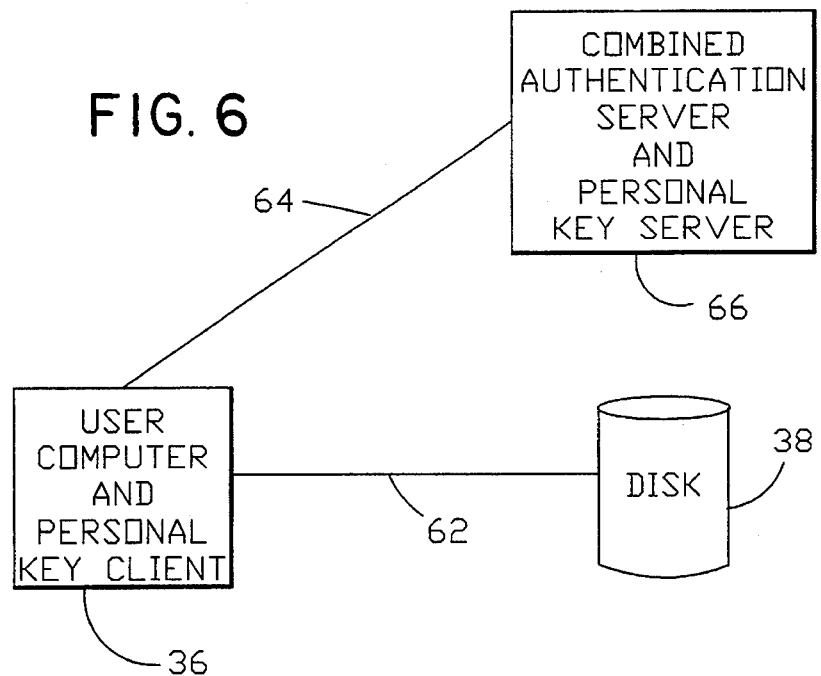

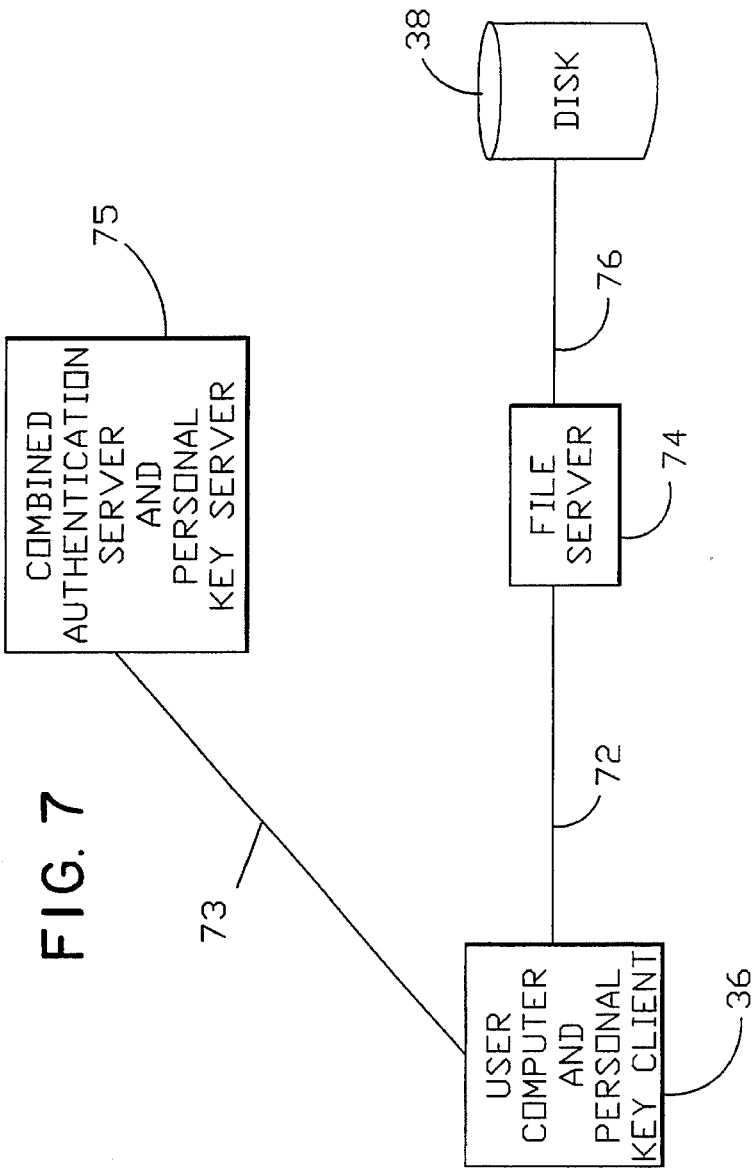

PERSONAL KEY ARCHIVE

FIELD OF THE INVENTION

This invention relates generally to the field of data processing systems. In particular, this invention relates to a security system for a networked data processing system. More specifically, this invention relates to a multiple workstation networked data processing system in which limited access to secure files on a secure workstation is granted to a protected class of users.

BACKGROUND OF THE INVENTION

The power of computing has grown, and continues to grow, rapidly. This increased computing power has provided users of the computing power new opportunities to use computers in new ways. Specifically, computing systems have evolved from being a large central process unit (CPU) with multiple terminals, to being multiple smaller processors interconnected with each other in a distributed processing environment. This shift in processor distribution altered the security problems involved with maintaining limited access to specified data in the processing system. When the computer system was a large CPU with many terminals, access to data was controlled through the operating system of the one CPU which allocated the resources of the CPU. This meant that controlling access to data was relatively simple through the technique of using passwords to identify the user. In a distributed processing environment however, a single processor does not have the resources to identify all users so that password identification is not practical. Moreover, there is no central control over the workstations so that security systems based on an operating system must be replicated in each workstation which is an inefficient use of the processor resources.

Data encryption is a term used for a method of preserving the privacy of data stored in a computing system or communicated over a network. For example, the Data Encryption Standard (reference 2) defines a method of encrypting data, and the IBM Information Protection System (reference 3) applies that standard to computer files. The latter product requires users to manually invoke encryption for specific files, whereas the Cryptographic File System for Unix (reference 1) automatically applies cryptography to files. In each of these products, an encryption key must be manually supplied by the user. The present invention provides a way to automate the handling of such encryption keys.

There are two basic types of data encryption methods: conventional or symmetric methods, such as DES reference 2, and public-key or asymmetric methods such as RSA reference 7. Conventional methods use the same key for both encrypting and decrypting data; public-key methods use different keys for the two operations. Conventional methods are generally faster than public-key encryption, and are thus more appropriate for bulk data file encryption as envisaged in this invention. The principal disadvantage of conventional encryption is complexity in the management of encryption keys. The purpose of the present invention is to ameliorate this disadvantage by providing a way to manage encryption keys used for conventional encryption of data files.

Message authentication is a term used for any procedure for ". . . determining with a high level of confidence whether a string of text (plaintext or ciphertext) has been altered (accidentally or intentionally)" (reference 5, p. 100). Message authentication should not be confused with user authentication and network authentication, which are described below. Message authentication can be used to verify the integrity of the contents of data files stored in computer systems. Data files that are protected with message authentication techniques can be themselves stored in either encrypted or plaintext form.

Procedures for message authentication are described in pages 100–105 and 359–367 of reference 5. These procedures depend upon the use of a key for encrypting a message authentication check. The present invention system provides a way for automating the management of such keys.

Many data encryption and message authentication systems require users to manually provide encryption keys. These keys are required both when files are first encrypted and later when they are decrypted. Disadvantages of manual key management include the awkward and time-consuming requirement for end-users to enter encryption keys, the possibility that users may forget keys, the likelihood that users may select cryptographically weak keys, the inability to access encrypted files when the individual who knows the keys is unavailable, and the need to distribute keys to all individuals who share access to encrypted files. The system according to addresses these issues by providing a way to automatically manage encryption keys.

In recent years, the reduced cost of computing equipment has encouraged the use of large numbers of small computers. Often, these are interconnected via computer networks to form distributed systems with many interdependent functions. For a distributed system shown in FIG. 1, data files on disk 8 may be transferred over link 10 and stored on a file server 2 that is remote from the computer 4 that access the files on the file server 2 through network 6. This is an alternative to the more traditional local storage of data files on disk 12 directly connected by link 14 to the computer 16 that access the files, as shown in FIG. 2.

Note that when data files are stored on a file server 2, as in FIG. 1, the data traverses a computer network 6 that is, in many cases, shared with many other user computers. In this situation, it is generally technically easy for equipment connected to the network to read the data bytes as they are transmitted between the computer user and the file server. Encrypting the data is necessary if privacy is desired. However, encryption requires some method to coordinate the encryption keys used for communication on the network.

A file server 2, as shown in FIG. 1, is often shared by multiple user computers for two reasons: (1) to amortize the cost of the file server over many users; and (2) to permit users to share data among themselves. Typically, the file server provides access controls which permit file owners to specify which other users can share their files. For example, user A may indicate that user B may read file 1 while user C may read and write file 2.

Although file access controls are effective for limiting the access of end-users to each others' files, access controls do not ensure complete privacy of files. Typically, system administrators have the ability to override these controls for purposes such as performing file backup. Data encryption of files has the advantage that only users who have the correct encryption keys can make use of the contents of files.

File access controls imply that the file server is able to reliably and securely identify users who request access to files. Typically, users identify themselves by executing a login process that involves entering a computer userid and matching password. The mechanism For validating the userid and password, and for maintaining the connection between the user and any processes run on behalf of the user, is called user authentication. User authentication should not be confused with message authentication, as discussed above. For example, referring to FIG. 1, the userid and password may be checked against a password file in either the client computer 4 or the file server 2, or both. Note that the password must be transmitted across the network 6 if the password validation is performed within the file server 2. Hence, the password itself should be encrypted if there is a concern about network eavesdropping.

A network authentication mechanism, such as Kerberos (reference 8), keeps the password file on a authentication server 20 as shown in FIG. 3. A special protocol is used to validate a userid and password entered on a user computer 22 against the password file on the authentication server 20. The latter generates authentication data, embodied in a ticket, that identifies the user. For example, the user computer obtains from the authentication server 20 a ticket to access the file server 24. The user computer 22 forwards this ticket to the file server 24 whenever the user wants to accesses a file. The file server 24 relies on the contents of the ticket to identify the user. The files are retrieved over link 28 from disk 30 to file server 24.

Kerberos uses cryptographic techniques to avoid sending the password on the network 26, to protect the contents of tickets, and to allow the file server 24 to be certain that the tickets are both valid and issued by the authentication server 20. Advantages of this scheme include (1) the password is kept in one place rather than in (potentially) multiple user computers or file servers 24; (2) the password is not transmitted over the computer network 26; (3) each ticket contains a dynamically-generated encryption key shared by the user computer 22 and the file server 24.

Other mechanisms can be used for network authentication. For example, KryptoKnight (reference 6), uses somewhat different protocols to achieve functions similar to Kerberos. As another example, a network authentication mechanism could be based upon public-key cryptography.

The previous discussion is presented in terms of file service, but applies equally to database service (both local to a user computer or distributed to a database server). The same mechanisms for user authentication and data access control are used with database systems. As with file services, complete data privacy can be achieved in database systems only by applying data encryption techniques. The latter imply the need to manage data encryption keys.

REFERENCES

1. Blaze, Matt, A Cryptographic File System for Unix, 1st ACM Conference on Communications and Computing Security, Fairfax, Va., Nov. 3–5, 1993.

2. Data Encryption Standard, National Bureau of Standards, Federal Information Processing Standards Publication Number 46, National Technical Information Service, Springfield, Va., Jan. 15, 1977.

3. IBM, Information Protection System Cryptographic Programs for CMS (IPS/CMS) User's Guide, IBM order number SH20-2621.

4. Kazar, Michael Leon, Ubik: Replicated Servers Made Easy, Proceedings of the Second Workshop on Workstation Operating Systems, Sep. 27–29, 1989.

5. Meyer, Carl H., and Matyas, Stephen M., Cryptography: A New Dimension in Computer Data Security, John Wiley & Sons, New York, 1982.

6. Molva, R., Tsudik, G., Van Herreweghen, E., Zatti, S., KryptoKnight Authentication and Key Distribution Service, Proceedings of ESORICS 92, Toulouse, October, 1992.

7. Rivest, R. L., Shamir, A., and Adleman, L., A Method for Obtaining Digital Signatures and Public-Key Cryptosystems, Communications of the ACM, Volume 21, Number 2, pages 120–126 (1978).

8. Steiner, Jennifer G., Neuman, B. Clifford, and Schiller, Jeffrey I., Kerberos: An Authentication Service For Open Network Systems, Usenix Conference Proceedings, pages 183–190, February 1988.

9. Howard, John L.; Kazar, Mitchael L.; Menees, Sherri G.; Nichols, David A.; Satyanarayanan, M.; Sidebotham, Robert N.; West, Michael J.; Scale and Performance in a Distributed File System, ACM Transactions on Computing Systems, Vol 6, No. 1, February 1988, pp 51–81.

10. Sandberg, Russel; Goldberg, David; Kleiman, Steve; Walsh, Bob; and Lyon, Bob, Design and Implementation of the SUN Network File System, USENIX Summer Conference Proceedings, Summer, 1985, pp 119–130.

OBJECTS OF THE INVENTION

It is an object of the present invention to provide an improved computing system.

It is another object of the present invention to provide an improved computing system having improved security.

It is a further object of the present invention to provide an improved computing system having improved security in a distributed computing environment.

It is still another object of the present invention to provide an improved computing system having improved security in a distributed computing environment in which system maintenance may be performed despite the non-availability of the file passwords.

It is another object of the present invention to provide an automatic system for managing keys used to encrypt data files stored in distributed computing systems.

It is an additional object of the present invention to provide an automatic system for managing encryption keys used to ensure the integrity of data files stored in distributed computing systems.

It is an additional object of the present invention to ensure the privacy of the encryption keys; that is, to ensure that only authorized persons or processes are permitted to retrieve encryption keys.

It is an additional object of the present invention to provide a way to recover encryption keys when authorized persons are unavailable (such as when employees have departed).

It is another object of the present invention to permit system management functions, such as file backup, to operate in a normal manner without knowledge of the encryption keys.

It is another object of the present invention to minimize technical costs (such as database size) and complexity (such as number of administrative functions) associated with the automatic key management system.

SUMMARY OF THE INVENTION

A broad aspect of the present invention is a a computing system having a security system for identifying if a user is permitted to create or access a data file on the computing system. The computing system has an authentication server; a key client; a key generator; a key server; a key database; an encrypted data file memory; the authentication server authenticates the user as permitted accessing the computing system the authentication server provides the user with a ticket validating the user as permitted to operate on the computing system; the key client of a creating user when a creating user creates a data file invokes the generator to generate a key corresponding to the data file; the key is provided to the key server; the key client of the creating user uses the key to encrypt the data file to form an encrypted data file which is stored in the encrypted data file memory; the key client of an accessing user, when an accessing user accesses the data file, sends the ticket and said data file identification data to the key server; the key server checks the ticket to verify that the accessing user is permitted to access the data file; the key server sends the key corresponding to the data file to the key client of the accessing user; and the key client of the accessing user uses the key to decrypt the encrypted data file.

Another broad aspect of the present invention is a method for providing a security system for identifying if a user is permitted to create or access a data file on the computing system. The method includes the steps of authenticating said user as permitted to operate on said computing system and in response to said user accessing said computing system said user is provided with a ticket by an authentication validating said user as permitted to operate on said computing system; when a creating user creates a data file said creating user invokes a generator to generate a key corresponding to said data file, said key is provided to said key client, said key client of said creating user uses said key to encrypt said data file to form an encrypted data file which is stored in an encrypted data file memory; said key client of an accessing user, when an accessing user accesses said data file, sends said ticket and said data file identification data to said key server, said key server checks said ticket to verify that said accessing user is permitted to access said data file, said key server sends said key corresponding to said data file to said key client of said accessing user, said key client of said accessing user uses said key to decrypt said encrypted data file.

BRIEF DESCRIPTION OF THE DRAWINGS

These and other objects, features and advantages of the present invention will become apparent upon a consideration of the following detailed description of the invention when read in conjunction with the drawing Figures, in which:

FIG. 5 shows a schematic diagram of another Personal Key Archive security system according to the present invention with files on a file server and a separate personal key server.

FIG. 6 shows a schematic diagram of another Personal Key Archive security system according to the present invention with files stored on a local disk and the personal key server co-located with the network authentication server.

FIG. 7 shows a schematic diagram of another Personal Key Archive security system according to the present invention with files stored on a file server and the personal key server located in the network authentication server.

FIG. 8 shows the organization of a file header used with the Personal Key Archive according to the present invention.

DETAILED DESCRIPTION

Figure 1:
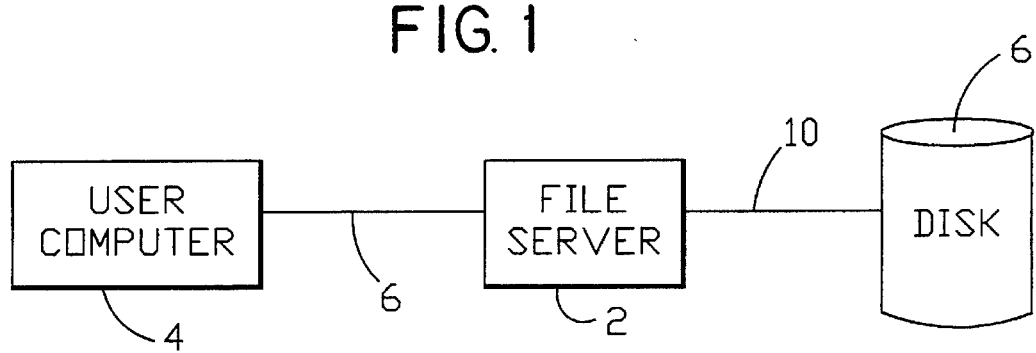
FIG. 1 shows a schematic diagram of a distributed system having a file server which stores data remote from a user computer.
Figure 2:
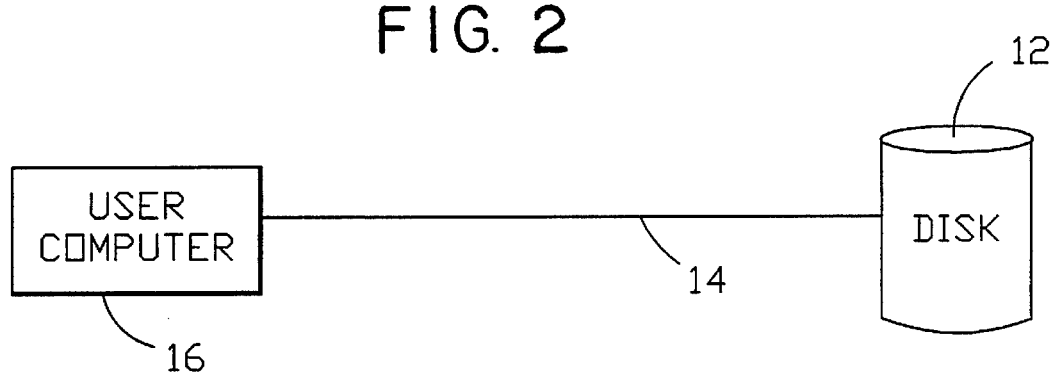
FIG. 2 shows a schematic diagram of a system using data stored locally to a user computer.
Figure 3:
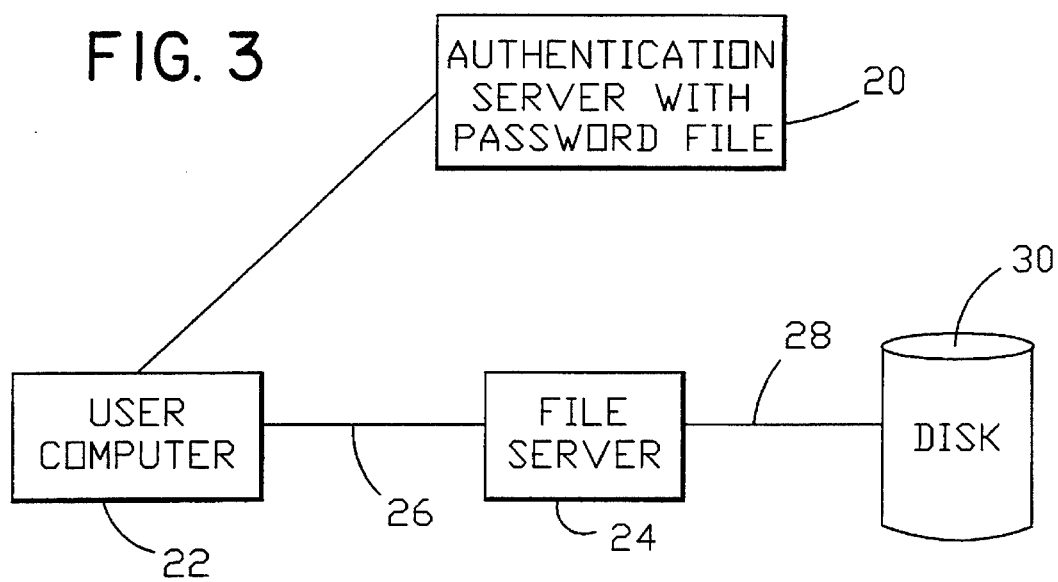
FIG. 3 shows a schematic diagram of Kerberos network authentication system.

The security system, according to the present invention, automatically manages keys used for encryption or message authentication of data files or individual entries in databases. The files or databases may be stored on servers 2, as in FIG. 1, or on user computers 16, as in FIG. 2. In the preferred embodiment of the present invention uses a distributed environment in which user computers and various servers are interconnected via a communications network. The invention uses a network authentication mechanism.

Figure 4:
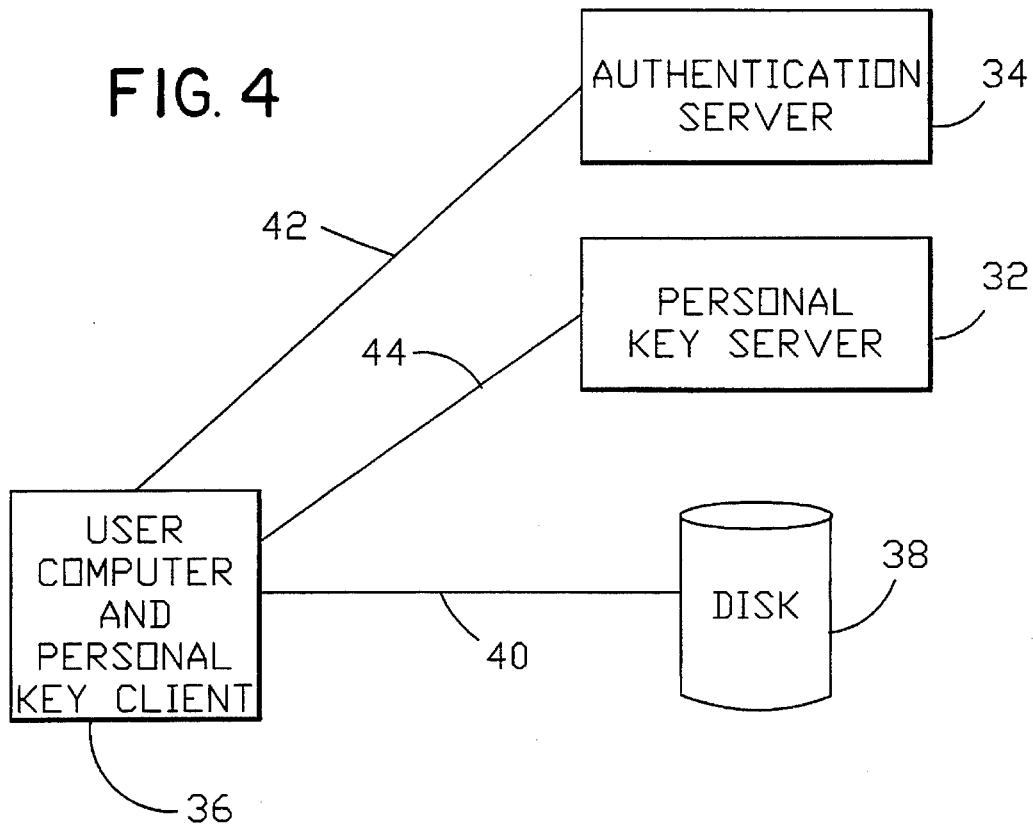
FIG. 4 shows a schematic diagram of a Personal Key Archive security system according to the present invention with files stored on a local disk and a separate personal key server.

The personal key archive security system according to the present invention uses two new components as shown in FIGS. 4 through 7: the Personal Key Client component on user computer 36 and the Personal Key Server. The Personal Key Server component 32 may execute upon a separate computer, as shown in FIGS. 4 and 5, or may be co-located with the authentication server portion as in FIGS. 6 and 7. For effective security, the Personal Key Server 32 is preferably not be located on the same machine as the data files themselves which are stored on local disc 38. Servers useful to practice the present invention are described in references 9 and 10 above.

Referring to FIG. 4 data files arc stored on local disc 38 which is connected to user computer 36 by network 40. Authentication server 34 is connected to user computer 36 by network 42. Personal key server 32 is connected to user computer 36 by network 44. Although FIG. 4 shows one user computer 36, it will be understood that there can be a plurality of user computers each connected to the authentication server 34 and Personal Key Server 32 by network corresponding to 42 and 44. These same comments apply to the embodiments of FIGS. 5–7.

The type of Server in FIG. 4 is a Key Distribution Facility. All user computers are able to communicate with Personal Key Server 32. The Personal Key Server 32 is trusted, meaning that all user computers 36 expect that the Personal Key Server 32 will perform its function reliably and securely. The Personal Key Server is physically and logically secure against intrusion by anybody other than administrative staff. If required by an installation, the Personal Key Server may be replicated on multiple computers, using the techniques described in reference 4, in order to improve operational reliability.

FIG. 5 schematically shows another Personal Key Archive according to the present invention wherein all elements of FIGS. 4 and 5 identified with the same reference numeral correspond to the same thing. The personal key archive of FIG. 5 includes a file server 50 connected to user computer 36 by network 52 and connected to disk 38 by link 54.

FIG. 6 schematically shows another Personal Key Archive system according to the present invention. Local user computer 38 includes a personal key client and data files are stored on a local disk 36 which is connected to local user computer 36 by link 62. Local computer 36 is connected by network 64 to a combined authentication server and personal key server 66.

FIG. 7 shows another schematic diagram of another embodiment of a Personal Key Archive security system according to the present invention. A user computer 36 containing Personal Key (client is connected by network 72 to file server 74 which stores data fields. File server 711 is connected by link 76 to disk 38. The user computer 36 is connected by network 73 to combined authentication servers and Personal Key Server 75.

In any configuration, the Personal Key Server maintains a Personal Key Database that contains certain information required to decrypt files or check their message authentication. The Personal Key Client communicates with the Personal Key Server as files are created and accessed. The Personal Key Server matches information in the Personal Key Client's messages with the contents of the database to determine the appropriate response to the Personal Key Client.

The Personal Key Archive provides two mechanisms for automatic key management: a basic method, and an enhanced method. The basic mechanism is discussed in order to clearly describe the underlying concept. The enhanced method offers certain advantages that are described below. Both methods can be implemented in any of the configurations shown in FIGS. 4 through 7, and both methods can manage keys used For either data encryption or message authentication, or both. Both methods can be applied to entire data files or to individual records in database systems. This description generally discusses the encryption or message authentication of entire data files. However, it should be understood that both the basic and enhanced methods can also be applied to individual records in databases.

In the basic method, each data file is encrypted by the Personal Key Client, on the user's computer, using a randomly-chosen key generated by the Personal Key Server at the time the file is created. The key is stored in the Personal Key Database located on the Personal Key Server. Kerberos or KryptoKnight tickets are used to identify the user to the Personal Key Server when the file is created or accessed. Although Kerberos and KryptoKnight are used herein as a source of the ticket, this is exemplary only and not limiting.

The Personal Key Server Database contains an entry for each file that is encrypted. These entries are indexed by information that identifies the files, such as the names and creation dates of the files. Each entry contains the key used to encrypt the corresponding file, the name of the owner of the file, and an access control list containing the names of any other users who are permitted to access the file.

When a file is created, the Personal Key Client sends the Kerberos ticket of the creator, along with the file's name and creation date, to the Personal Key Server. The Personal Key Server randomly generates a file encryption key, creates a new entry in the database, and responds to the Personal Key Client with the file encryption key. The Personal Key Client then uses the key to encrypt the data as it is written to the file.

When a file is accessed (both for reading and for updates), the Personal Key Client sends the Kerberos ticket of the accessor, the file's name, and the file's creation date to the Personal Key Server. The latter retrieves the appropriate entry in the database and checks the identity of the accessor (as provided in the Kerberos ticket) against the file owner's name and the access control list in the database entry. If the accessor is either the owner or one of the users named in the access control list, the Server sends the file encryption key back to the Personal Key Client. The latter uses the key to decrypt the data as it is read from the file.

Certain user actions require that additional messages be exchanged with the Personal Key Server in order to maintain the accuracy of the Personal Key Database:

When a file is renamed (or any other identifying information, such as the file creation date, is changed) the Personal Key Client preferably sends the new and old filenames (or other identifying data) to the Personal Key Server so that the Personal Key Server can update the Personal Key Database.

If the recorded owner of a file changes, the Personal Key Server is preferably notified so that the appropriate Personal Key Database entry can be updated.

If there are modifications to the access control list messages are preferably sent to the Personal Key Server to cause updates to the Personal Key Database.

These user actions may only be performed by the owner of the file, as identified in the Personal Key Database entry and verified via the Kerberos ticket accompanying the messages between the Personal Key Client and Personal Key Server.

The messages sent between the Personal Key Client and the Personal Key Server are themselves encrypted in session keys that are provided by Kerberos. This "double encryption" ensures that the file encryption keys themselves do not appear in the clear on the communication path between the Client and the Server.

The basic mechanism can be applied to protect individual records in database systems by indexing the entries in the Personal Key Database by the same indexing information used for accessing the database records themselves.

The basic mechanism can be adapted to verify the integrity of files or database records against inadvertent or malicious modifications by adding an encrypted message authentication check field to the end of the files or records, as described on page 100 of reference 5. This field is encrypted under a key managed by the basic mechanism as described above. The field is generated when a file is written, and is verified either by completely scanning the file or record when it is opened, or alternatively verified only when a file is fully read by an application program.

A minor variation of this method is to have the Personal Key Client (rather than the Server) generate the file encryption key. This would be sent to the Personal Key Server at the time a file is created, so that the Personal Key Server could store the key in the Personal Key Database. A disadvantage of this variant is that it would be harder to ensure the cryptographic quality of the key if generated at the Personal Key Client compared to generating the key at the Personal Key Server.

The enhanced method combines a technique described on page 283 of reference 5 with the basic method described above. The header associated with each file preferably accompanies the file should the file be moved or renamed or backed-up. The header may be associated with the file in a number of ways: as the first few bytes of the file, or as a trailer at the end of the file, or stored in the file's directory entry, or in a separate area associated with the file's directory entry, or in a local database. These ways are listed as examples of methods of associating the files and the headers; other methods may also be used.

An example of a file header is shown in FIG. 8 and contains the file encryption key for the file, itself encrypted under a control key (defined below). The header also contains the control key index number, the name of the owner of the file, and the access control list of users permitted to access the file. The entire file header is "protected" against modification by a message authentication check field that is appended to the header and is encrypted under the same control key.

The control key mentioned above is a randomly-generated key that is used only to encrypt the individual file encryption keys of multiple files, and to encrypt the message authentication check fields of the headers of the same files. One control key is used for multiple files; a new control key is generated for every N files and/or when M hours or days have elapsed. N and M are parameters that could be varied for different implementations or installations. The fact that individual control keys are shared by multiple files is not a cryptographic weakness, since the keys are used only to encrypt file encryption keys that are themselves random numbers.

Control keys are generated by and kept entirely within the Personal Key Server. At any given time, the control key currently being used for newly-generated files is called the current control key. Outside the Personal Key Server, control keys are identified by control key index numbers, which are unique numbers that identify individual control key values. Each file header contains the index number that identifies the particular control key used to encrypt the file encryption key contained in the same header.

In this enhanced method, the Personal Key Database is structured very differently from the basic method. The Database contains an entry for each control key that has been generated. The database entries are indexed by the control key index numbers. They contain the actual values of the control keys themselves.

The operation of the enhanced method is similar to the basic method. Each data file is encrypted by the Personal Key Client, on the user's computer, using a randomly-chosen key generated by the Personal Key Server at the time the file is created. Kerberos or KryptoKnight tickets are used to identify the user to the Personal Key Server when the file is created or accessed. Unlike the basic method, the file encryption key is stored in the file header, and is kept from public use by encrypting the file encryption key itself under a control key known only to the Personal Key Server.

When a file is created, the Personal Key Client sends a message to the Personal Key Server with a Kerberos ticket identifying the file creator. The Personal Key Server prepares a file header as outlined above, and sends the header and the file encryption key itself back to the Personal Key Client. The latter stores the file header with the file, and uses the key to encrypt the file as it is written by the application.

When a file is accessed (both for reading and for updates), the Personal Key Client reads the file header and sends it to the Personal Key Server, along with a ticket identifying the accessor. The Personal Key Server uses the control key index number in the header to lookup the control key in the Personal Key Database. The Personal Key Server then uses the control key to validate the message authentication check field; if it is invalid, the Personal Key Server rejects the access request. If the header is valid, the Personal Key Server then compares the accessor's name (from the ticket) against the name of the file owner and the names in the access control list. If the accessor's name is not found, then the Personal Key Server rejects the access request. If the name is found, then the Personal Key Server decrypts the file encryption key and sends it back to the Personal Key Client. The Personal Key Client can then use the file encryption key to decrypt the file as it is read.

When a file owner wishes to add or delete a user from the access control list, or when the file owner's name is changed, the Personal Key Client sends the file's current header to the Personal Key Server, along with the details of the change. The Personal Key Server validates the header in the same manner as when a file is accessed, and then updates the header as requested by the file owner. The Personal Key Server then sends the updated header back to the Personal Key Client, which inserts the updated header into the file.

The messages sent between the Personal Key Client and the Personal Key Server are themselves encrypted in session keys that are provided by Kerberos. This "double encryption" ensures that the file encryption keys themselves do not appear in the clear on the communication path between the Personal Key Client and the Personal Key Server.

The enhanced mechanism can be applied to protect individual records in database systems by extending such records with a new field containing the header shown in FIG. 8. The header then applies to the particular database record. The operations of creating, accessing, and controlling access to the records operate in a manner similar to that described above.

The enhanced mechanism can be adapted to verify the integrity of files or database records against inadvertent or malicious modifications by adding another message authentication check field to the header. This second message authentication check applies to the contents of a file or record, rather than to the header. This second check is generated when the file is closed, and is validated either by scanning the file or record when it is opened, or by verifying the check when the file is fully read by an application.

As specified above, a single control key is used for two purposes: to encrypt the file encryption key and to encrypt the message authentication field. At very minor additional cost, additional control keys or other values could be stored in the Personal Key Database. Such values might include a secondary control key for the message authentication check of the header, another control key for the message authentication check of the file itself, and/or an initialization vector for use when encrypting the file. These values would all be referenced by the single control key index number stored in the header of each file.

As with the basic mechanism, a minor variation of this method is to have the Personal Key Client (rather than the Personal Key Server) generate the file encryption key. This would be sent to the Personal Key Server at the time a file is created, so that the Personal Key Server could generate the file header. One disadvantage of this variant is that it would be harder to ensure the cryptographic quality of the key if generated at the Personal Key Client compared to generating the key at the Personal Key Server. A more serious disadvantage of this variant is that it would permit a modified Personal Key Client to attempt discovery of the current control key by using chosen file encryption keys in a "chosen plaintext" type of cryptographic attack.

The two mechanisms share a number of advantages:

1. File encryption keys are automatically managed.
   a. No additional effort is required on the part of users.
   b. Only persons who have the Kerberos tickets of the owners of files, and other users given access by the file owners, can read the unencrypted form of the files.
   c. When a file is shared among multiple users, its file encryption key is automatically made available to all users.
   d. File management functions, such as backup and restoration of files, operate without change. Persons who control such functions can view only the encrypted form of the files; they have no access to the unencrypted versions of the files. (This assumes that personnel who perform file management functions are distinct from those who administer the Kerberos authentication database. As discussed below, the latter can always gain access to encrypted files by changing the passwords of Kerberos accounts.)
   e. Users cannot forget or lose file encryption keys. Hence there is no risk of inadvertent loss of access to data files.

f. Each file is encrypted under a unique key. The fact that the keys are unique tends to frustrate certain types of cryptographic analysis of the encrypted files.

g. File encryption keys are randomly generated, making them of higher cryptographic quality than if they were chosen by users.

2. The "foundation" for access to files is the Kerberos or KryptoKnight authentication of individual users. This has several consequences:

a. Typically, Kerberos implementations depend upon passwords, but they could also use other means of identifying individuals such as smart cards. Personal Key Archive can work with and enhance an installation that uses any method of validating users to Kerberos.

b. A user can change his or her Kerberos password without any impact on the encrypted data files or the contents of the Personal Key Database.

c. If a user leaves an installation, the organization can recover access to the user's encrypted files by resetting the user's Kerberos password. Hence the organization has no risk of inadvertent loss of access to data files due to the unavailability of file owners.

d. A corollary of the previous item is that the security of encrypted files is equivalent to the security of the Kerberos authentication server; whoever can update the Kerberos database can access all encrypted files. This is why it is acceptable to co-locate the Personal Key Server and the Kerberos server as shown in FIGS. 6 and 7.

3. In file server configurations (as in FIG. 1), files are encrypted on user computers rather than on the file server. This has several beneficial aspects:

a. The computing load of data encryption is distributed among multiple user machines rather than concentrated on a single, shared file server. Hence the total network capacity for data encryption increases as more user computers are added to the network.

b. The computing load of data encryption is incurred by the user machines. Hence any economic tradeoff between performance and machine capacity can be customized to the needs of individual users.

c. Data transmitted over the network between user machines and the file server is encrypted. Hence it cannot be read by tapping the network.

The basic method described above has several serious limitations:

1. The size of the Personal Key Database is related to the total number of files in the installation. That could easily amount to tens or hundreds of thousands of entries. Furthermore, the individual entries must be varying-length in order to accommodate varying numbers of entries in the access control lists. Furthermore, these lists can be updated at any time, so the entire Personal Key Database must be read-write. The combination of a large database with varying-length read-write entries makes For a fairly complex database design.

2. The Personal Key Database is preferably backed-up or replicated at least as often as the encrypted files are backed-up, since the loss of the Personal Key Database implies loss of access to the unencrypted form of the files.

3. The Personal Key Database must be updated whenever a file is renamed. In current systems, this may be difficult or impossible to ensure since there are ways that files can be implicitly renamed (e.g. by restoration from a backup tape under another name) without explicit use of the system rename function.

The enhanced method addresses the limitations of the basic method:

1. The number of entries in the Personal Key Database is related to the number of control keys, rather than the total number of data files. If a new control key is generated every N files, then the number of Personal Key Database entries is a fraction (one-Nth) of the number of files. If a new control key is generated every M days, then the number of Personal Key Database entries is related only to the amount of time that has elapsed since the Personal Key Database was created. In the latter case, the total size of the Personal Key Database can be completely estimated in advance.

The size of Personal Key Database entries is fixed, since they contain only the control key and perhaps a few other cryptographic variables. Furthermore, existing entries in the Personal Key Database are never updated; the only changes are the appending of new entries to the end of the Personal Key Database. Hence the design of the Personal Key Database is technically simpler, and the total size of the Personal Key Database is smaller, than with the basic method.

2. The Personal Key Database needs to be backed up or replicated only when a new control key is generated. If the design choice is made to produce a new control key only as time elapses, then the backup or replication schedule can be completely scheduled in advance.

3. Renaming, backing-up and restoring, or other manipulations of the name or location of an encrypted file have no impact on the ability to recover the unencrypted form of the file as long as the header remains associated with the file.

While the present invention has been shown and described with respect to specific embodiments, it will be understood that it is not thus limited. Numerous modifications, changes and improvement will occur which fall within the scope and spirit of the invention.

We claim:

1. A computing system for automatically managing keys to encrypt and decrypt stored data; comprising:

an authentication server;

a key client;

a key generator;

a key server;

a key database;

an encrypted data memory;

said authentication server authenticates said user and provides said user with a ticket identifying said user;

said key client of a creating user, when a creating user creates stored data invokes said generator to generate a key corresponding to said stored data to form encrypted stored data, said key is provided to said key server, said key client of said creating user uses said key to encrypt said stored data which is stored in said encrypted data memory;

said key client of an accessing user, when an accessing user accesses said stored data, sends said ticket and identification data for said stored data to said key server, said key server obtains said authentification data from said ticket for said accessing user, said key server sends said key corresponding to said stored data to said key client of said accessing user, said key client of said accessing user uses said key to decrypt said encrypted stored data.

2. A computing system according to claim 1, wherein said key client sends said encrypted stored data to said encrypted data memory.

3. A computing system according to claim 1, wherein said key server stores said key and said file identification data in an entry in a key data base.

4. A computing system according to claim 1 wherein said key is a random number.

5. A computing system according to claim 1, wherein said ticket is a set of authentication data.

6. A computing system according to claim 1, wherein said user is authenticated by said authentication server by providing a userid and password to said authentication server.

7. A computing system according to claim 1, wherein said key client resides on a user computer and said key server is a separate unit from said user computer.

8. A computing system according to claim 7, wherein said authentication server is a separate unit from said key server.

9. A computing system according to claim 7, wherein authentication server and said key server are in the same unit.

10. A computing system according to claim 1, further including a file server.

11. A computing system according to claim 6, further including a file server.

12. A computing system according to claim 7, further including a file server.

13. A computing system according to claim 1, wherein there are a plurality of user computers each having a key client and each connected by a network to said key server and to said authentication server.

14. A computing system according to claim 1, wherein said computing system is a single computing system having a plurality of users and wherein said key client, said authentication server and said key server are parts of said single system.

15. A computing system according to claim 1, wherein said key server distinguishes between said creating user and said accessing user who is not a creating user.

16. A computing system according to claim 15, wherein said key server stores an identification of said creating user, said accessing user and an owning user in said key database.

17. A computing system according to claim 1, wherein there are actions which only a creating user is permitted to perform on said stored data as identified in said key database, messages send between said key client and said key server relating to said actions are accompanied by said ticket of said creating user and said messages are encrypted.

18. A computing system according to claim 17, wherein said actions are selected from the group consisting of renaming said stored data, changing a user who owns said stored data and modifying a list of users permitted to access said data file.

19. A computer system according to claim 1, wherein said generator is part of said key client and said key is sent to said key server when said stored data is created.

20. A computing system according to claim 1, wherein said generator is part of said key server, said key client invokes said generator to generate said key by sending said ticket corresponding to said creating user to said key server, said key server in response to receiving said ticket corresponding to said creating user generates said key, said key server sends said key to said key client of said creating user.

21. A computing system according to claim 1, further including a header associated with said storage data.

22. A computing system according to claim 21, wherein said header accompanies said stored data if said data file is moved, renamed or backed up.

23. A computing system according to claim 21, wherein said header contains said key, an identification of an owner user of said stored data, a message authentication check field, a control key identifier and a list of users permitted to access said stored data.

24. A computing system according to claim 23, wherein said key is encrypted under a control key.

25. A computing system according to claim 24, wherein said control key is a randomly generated key used to encrypt said key of said stored data and to encrypt message authentication check fields of said header.

26. A computing system according to claim 25, wherein said control key applies to N data files where N is greater than or equal to zero.

27. A computing system according to claim 25, wherein said control key applies to said N data files created within a fixed period of time.

28. A method for automatically managing keys used to encrypt and decrypt stored data on a computing system comprising the steps of:

authenticating said user, said user is provided with a ticket identifying said user as permitted to operate on said computing system;

when a creating user creates stored data, said creating user invokes a generator to generate a key corresponding to said stored data, said key is provided to said key client, said key client of said creating user uses said key to encrypt said stored data to form encrypted stored data which is stored in an encrypted data memory;

said key client of an accessing user, when an accessing user accesses said stored data file, sends said ticket and said data file identification data to said key server, said key server checks said ticket to verify that said accessing user is permitted to access said data file, said key server sends said key corresponding to said data file to said key client of said accessing user, said key client of said accessing user uses said key to decrypt said encrypted stored data.

29. A method of modifying stored data on a computer system, comprising:

retrieving encrypted stored data from a first storage media, said encrypted stored data being an encryption of said stored data;

maintaining a database on a second storage media for correlating said encrypted stored data to a userid and a data encryption key;

retrieving said data encryption key corresponding to said encrypted stored data from said second storage media; and decrypting said encrypted stored data using said retrieved encryption key.

30. A computer system, comprising:

means for retrieving encrypted stored data from a first storage media, said encrypted stored data being an encryption of said stored data;

means for maintaining a database on a second storage media for correlating said encrypted stored data to a userid and a data encryption key;

means for retrieving said data encryption key corresponding to said encrypted stored data from said second storage media; and means for decrypting said encrypted stored data using said retrieved encryption key.

31. A computer system according to claim 1, wherein said stored data is selected from the group consisting of a data file and a data base record.

32. A computing system according to claim 1, further including a means to validate said user as permitted to operate on said computing system.

33. A computing system according to claim 21, further including a means for sending encrypted messages between said personal key client and said personal key server.

34. A computing system according to claim 33, wherein said means for sending encrypted messages encrypts said messages using a message encryption key provided by said ticket.

35. A computing system for automatically managing keys to encrypt and decrypt stored data;

an authentication server;

a key client;

a key generator;

a key server;

a key database;

an encrypted data memory;

said authentication server authenticates said user and provides said user with a ticket identifying said user;

said key client of a creating user, when a creating user creates said stored data invokes said generator to generate a key corresponding to said stored data, said key is provided to said key server, said key client of said creating user uses said key to encrypt said stored data to form an encrypted stored data which is stored in said encrypted data memory;

said key client of an accessing user, when an accessing user access said stored data sends said ticket and stored data identification data to said key server, said key server checks said ticket to verify that said accessing user is permitted to access said stored data said key server sends said key corresponding to said stored data to said key client of said accessing user, said key client of said accessing user uses said key to decrypt said encrypted stored data;

a header associated with said stored data;

said header contains said key, an identification of an owner of said stored data, a message authentication check field, a control key identifier and a list of user permitted to access said stored data;

said key is encrypted under a control key;

said control key is used to encrypt message authentication check fields of said header;

said ticket contains a message key for encrypting messages sent between said key client and said key server.

36. A computing system according to claim 1, wherein said computing system is an automated management system for automatically managing keys to encrypt and decrypt stored data.

37. A computing system according to claim 3, wherein said key server stores an identification of said creating user, said accessing user and an owning user in said key database.

38. A method of modifying stored data on a distributed computer system, comprising:

authenticating an identity of a user via an authentication system that provides identification tickets, said user having a userid;

storing encrypted data on a first storage media, said encrypted data being an encryption of said stored data;

maintaining a database on a second storage media for correlating said encrypted stored data to a data encryption key and said userid;

validating said userid identified in an authentication ticket against said userid contained in said database, and automatically choosing whether to grant access to said encrypted stored data;

retrieving said data encryption key corresponding to said encrypted stored data from said second storage media; and decrypting said encrypted stored data using said retrieved encrypted key.

39. A distributed computer system, comprising:

means for authenticating a user, said user having a userid;

means for retrieving encrypted stored data from a first storage media, said encrypted stored data being an encryption of said stored data;

means for maintaining a database on a second storage media for correlating said encrypted stored data to a data encryption key and said userid;

means for validating an authenticated user as one of the userids listed in said database as permitted to access said encrypted stored data;

means for retrieving said data encryption key corresponding to said encrypted stored data from said second storage media; and means for decrypting said encrypted stored data using said retrieved encryption key.

* * * * *